(12) United States Patent
Kawakami et al.

(10) Patent No.: US 7,420,782 B2
(45) Date of Patent: Sep. 2, 2008

(54) ROTATING DISK STORAGE DEVICE

(75) Inventors: Takanori Kawakami, Kanagawa (JP);
Shinichi Kimura, Kanagawa (JP);
Hiroki Kitahori, Kanagawa (JP);
Hiroshi Matsuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 489 days.

(21) Appl. No.: 10/893,070

(22) Filed: Jul. 16, 2004

(65) Prior Publication Data

US 2005/0057859 A1 Mar. 17, 2005

(30) Foreign Application Priority Data

Sep. 11, 2003 (JP) .............................. 2003-319977

(51) Int. Cl.
*G11B 5/55* (2006.01)
(52) U.S. Cl. .............. 360/264.7; 360/97.02; 360/264.8; 360/264.9; 360/265; 360/266.4; 360/266.7; 360/266.8; 360/266.9

(58) Field of Classification Search .............. 360/264.7, 360/264.8, 264.9, 265, 266.4, 266.7, 266.8, 360/266.9, 97.02
See application file for complete search history.

(56) References Cited

U.S. PATENT DOCUMENTS

| 5,122,702 | A  | * | 6/1992  | Nakazato .................... 310/13 |
| 6,002,546 | A  | * | 12/1999 | Yagi et al. ................ 360/97.02 |
| 6,347,023 | B1 | * | 2/2002  | Suwa ..................... 360/264.8 |
| 6,445,549 | B1 | * | 9/2002  | Okunaga et al. ......... 360/264.8 |
| 6,603,633 | B2 | * | 8/2003  | Heaton et al. ............ 360/97.02 |

FOREIGN PATENT DOCUMENTS

JP          11-185412          7/1999

* cited by examiner

*Primary Examiner*—Andrea Wellington
*Assistant Examiner*—Carlos E Garcia
(74) *Attorney, Agent, or Firm*—Townsend and Townsend and Crew LLP; Rambod Nader

(57) ABSTRACT

Embodiments of the present invention provide a rotating disk storage device adopting a thin yoke structure. In one embodiment, the yoke structure of a voice coil motor includes a base of a casing formed from a ferromagnetic material; an auxiliary yoke disposed so as to be magnetically coupled to the base; a magnet disposed so as to be magnetically coupled to a front surface of the auxiliary yoke; and a main yoke provided with yoke legs magnetically coupled to the auxiliary yoke and an opposing surface that confronts a front surface of the magnet. In addition, a yoke gap is defined between the opposing surface and the front surface of the magnet. The base and the auxiliary yoke form a magnetic path, which allows a dedicated yoke on a lower portion to be eliminated.

11 Claims, 10 Drawing Sheets

(A)

(B)

(C)

(A)

(B)

(C)

(D)

(E)

(F)

(A)

(B)

(C)

(D)

(A)

(B)

(C)

(D)

though they are formed from a ferromagnetic material; a casing
ROTATING DISK STORAGE DEVICE

BACKGROUND OF THE INVENTION

The present invention relates to a rotating disk storage device such as a magnetic disk drive, an optical magnetic disk drive, or the like and, more particularly, to a rotating disk storage device having a driving mechanism for an actuator for positioning a head at a recording medium.

With the recent progress made in the utilization of magnetic disk drives in portable apparatuses, there is a growing need for an even more compact and thinner body. A need is also pressing for a cost reduction of each individual component part. The magnetic disk drive uses an actuator that supports and positions correctly at a required position a head for reading and writing data from and to a rotating magnetic disk. Known as a driving mechanism for the actuator is a voice coil motor (VCM) that is composed of a coil, a magnet, and a yoke.

FIG. 5 of Japanese Patent Laid-open No. Hei 11-185412 shows the construction of a typical VCM, which is shown in FIG. 1(A) in this specification. Referring to FIG. 1(A), a magnetic head 14 is mounted on a leading end of a carriage 17. A coil 18 is mounted on a trailing end of the carriage 17. FIG. 1(B) is a cross-sectional view of a VCM 15 shown in FIG. 1(A), taken along line A-A of FIG. 1(A). A lower yoke 2 formed into a flat sheet shape is mounted on a mounting surface 13b' of a base 13. The lower yoke 2 forms a magnetic path with an upper yoke 1 attached thereto by way of column supports 1a. The magnetic disk 11 is supported for rotation about a spindle shaft 12 on the base 13.

Opposing magnets 3 are respectively attached to the surfaces, opposing to each other, of the lower yoke 2 and the upper yoke 1. A gap 4 is defined between the opposing magnets 3. A magnetic flux generated by the magnets passes through a magnetic circuit formed by the gap 4, the lower yoke 2, and the upper yoke 1. The coil 18 is disposed in the gap so as to freely move therethrough. When current is allowed to flow through the coil 18, the carriage 17 acquires a driving force in a horizontal direction. The base 13 is made by an aluminum die casting for general ease of manufacturing.

As shown in the Japanese patent reference above, the upper yoke and the lower yoke make up the magnetic circuit that serves as the magnetic path for forming a magnetic field in the gap in the conventional VCM. There is a pressing need for cost reduction in magnetic disk drives, because of their expanding future applications in portable apparatuses and other reasons. To meet this mounting need, a technique is being examined for forming an iron sheet stock into a casing through pressworking, instead of using the aluminum die casting. Ways are also studied for reducing the number of parts used in the yoke circuit of the VCM in order to implement an even thinner body.

BRIEF SUMMARY OF THE INVENTION

Embodiments of the present invention provide a rotating disk storage device, such as a magnetic disk drive, an optical magnetic disk drive, or the like, that realizes a thinner body and a reduced number of parts used by removing a dedicated yoke from a yoke structure used in a motor for driving the actuator.

Embodiments of the present invention use a casing for the yoke structure of the motor for driving the actuator driving mechanism of a rotating disk storage device, thereby eliminating the dedicated yoke. Another feature of the present invention is to use an auxiliary yoke that is thinner than the dedicated yoke, thereby reducing the number of parts used and realizing a thinner body of the storage device.

According to a first aspect of the present invention, there is provided a rotating disk storage device comprising: a rotating disk recording medium; an actuator head suspension assembly provided with a head for reading data from the rotating disk recording medium; a casing main body provided with a first yoke area formed from a ferromagnetic material; a casing lid provided with a second yoke area formed from a ferromagnetic material and coupled magnetically to the first yoke area; a magnet disposed so as to be magnetically coupled to either the first yoke area or the second yoke area; and a coil held in position on the actuator head suspension assembly and disposed in a yoke gap defined between the magnet and either the first yoke area or the second yoke area.

According to a second aspect of the present invention, there is provided a rotating disk storage device comprising: a rotating disk recording medium; an actuator head suspension assembly provided with a head for reading data from the rotating disk recording medium; a casing main body provided with a first yoke area formed from a ferromagnetic material; a casing lid provided with a second yoke area formed from a ferromagnetic material and coupled magnetically to the first yoke area; a first magnet and a second magnet disposed so as to be magnetically coupled, respectively, to the first yoke area and the second yoke area; and a coil held in position on the actuator head suspension assembly and disposed in a yoke gap defined between the first magnet and the second magnet.

According to a third aspect of the present invention, there is provided a rotating disk storage device comprising: a rotating disk recording medium; an actuator head suspension assembly provided with a head for reading data from the rotating disk recording medium; a casing main body provided with a yoke area formed from a ferromagnetic material; an auxiliary yoke disposed so as to magnetically coupled to the yoke area of the casing main body; a magnet disposed so as to be magnetically coupled to the auxiliary yoke area; a main yoke provided with a yoke leg coupled magnetically to the auxiliary yoke and an opposing surface confronting the magnet; and a coil held in position on the actuator head suspension assembly and disposed in a yoke gap defined between opposing surface of the first magnet and the magnet.

The first yoke area and the second yoke area are provided with an arrangement that is adaptable to a magnetic circuit for a motor for driving the actuator head suspension assembly. The first yoke area and the second yoke area may be magnetically coupled using a wall portion of the casing main body, or magnetically coupled using a connection yoke. When the first yoke area and the second yoke area are magnetically coupled, it should mean that the two are coupled together in a mode allowing a magnetic flux suitable for the magnetic circuit for the motor for driving the actuator head suspension assembly to be passed through.

The magnet may be mounted so as to be magnetically coupled to both an inner surface of the first yoke area and an inner surface of the second yoke area. This arrangement enhances a magnetic field strength generated in the yoke gap, providing an even greater driving force in the coil. An area thicker than others can be provided in the first yoke area and the second yoke area, or either the first yoke area or the second yoke area. This arrangement provides a thicker wall only for the yoke area in the casing main body or the casing lid, while keeping a thinner wall on others. This makes the device thinner and lighter in weight and saves materials.

Although not functioning as a magnetic circuit on its own, the auxiliary yoke can form a magnetic circuit when making up a magnetic flux path together with the first yoke area or the second yoke area. The dimension of the first yoke area thickness or the second yoke area thickness plus the auxiliary yoke thickness can be made smaller than the dimension of the dedicated yoke thickness plus the casing thickness. This makes for a thinner device. The main yoke can function as a magnetic circuit on its own. The casing main body and the casing lid may therefore be formed of a ferromagnetic material or nonmagnetic material.

In accordance with embodiments of the present invention, it is possible to provide a thin rotating disk storage device by eliminating the dedicated yoke from the yoke structure used in the motor for driving the actuator, thereby reducing the height of the yoke structure. Further, it is possible to provide a rotating disk storage device having a reduced number of parts used in the yoke structure.

DETAILED DESCRIPTION OF THE INVENTION

Figure 2:
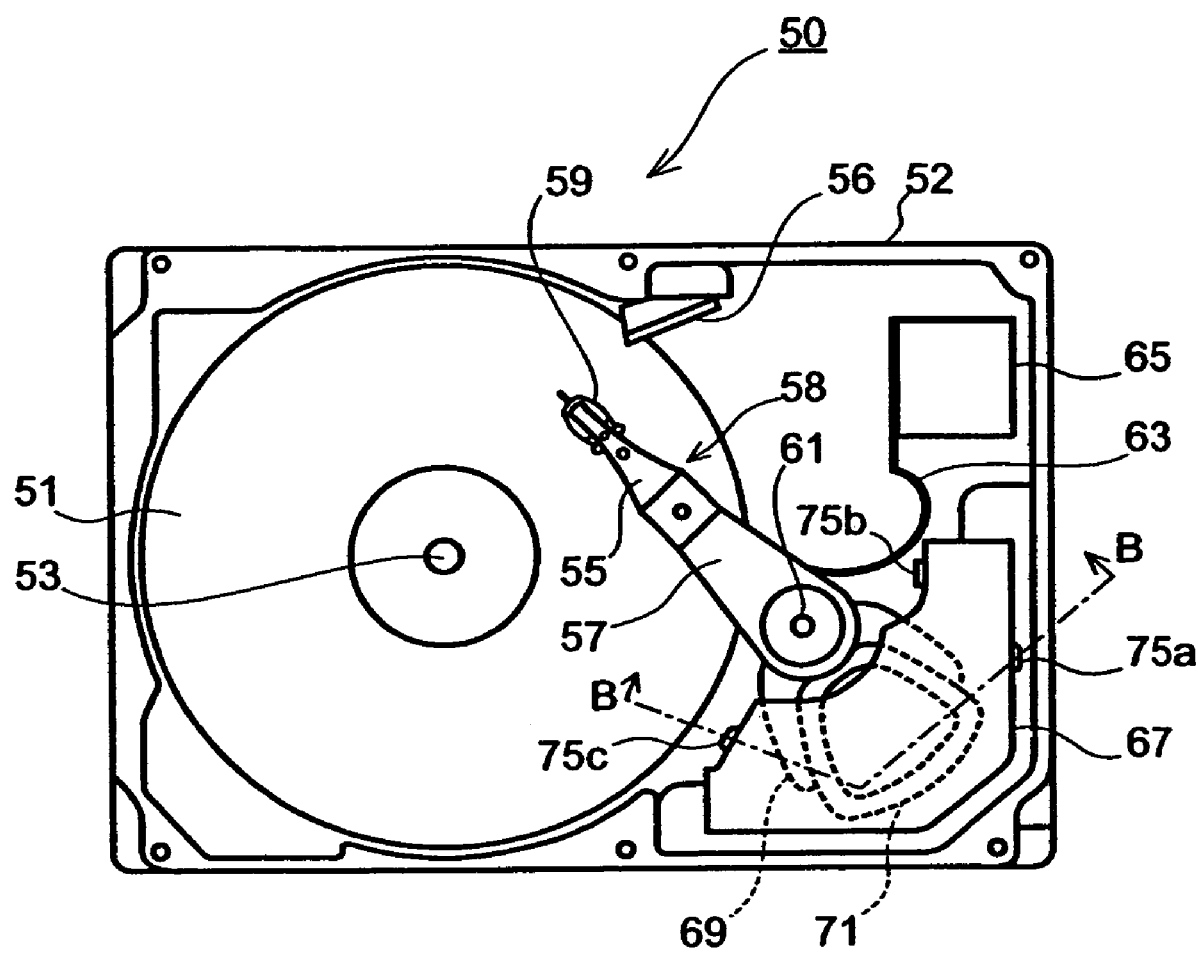
FIG. 2 is a plan view showing schematically a magnetic disk drive 50 according to a first embodiment of the present invention.

FIG. 2 is a plan view showing schematically a magnetic disk drive 50 in accordance with a specific embodiment of the present invention. Throughout all the accompanying drawings in the present application, like parts are denoted by like reference numerals. The entire body of the magnetic disk drive 50 is covered with a casing main body 52 and a casing lid 54 (see FIG. 3). The casing main body 52 is formed by pressworking an ordinary cold-rolled steel plate (SPCC), which is a ferromagnetic material.

The casing main body 52 is composed of a base and sidewalls that provide a mounting surface for components of the magnetic disk drive 50. The casing lid 54 is mounted to the sidewalls. The casing lid 54 is made of a thin aluminum sheet as a nonmagnetic body. In accordance with the embodiment of the present invention, however, the casing lid 54 may still be made of a ferromagnetic material. In addition, various selection methods as described in other embodiments of the present invention are available for the materials of the casing main body and the casing lid.

A magnetic disk 51 is supported for rotation about a spindle shaft 53 erected on the base of the casing main body 52. An actuator head suspension assembly 58 is composed of a head suspension assembly (HSA) 55 and an actuator assembly 57. The HSA 55 is provided at its leading end with a head 59, which reads data from, and/or writes data to, the magnetic disk 51.

The actuator assembly 57 is composed of an actuator beam supporting the HSA 55, a bearing portion of a pivot shaft 61, and a voice coil motor 67. The voice coil motor 67 is composed of a coil support 69, a voice coil 71 supported by the coil support 69, and yokes (see FIGS. 3 through 5). The construction of the voice coil motor 67 will be described in detail with reference to FIGS. 3 through 5.

A ramp 56 has a function of providing a sliding surface for a merge lip (now shown) provided on a leading end of the HSA 55, thereby allowing a head/slider to be retracted when a rotating magnetic disk 51 is brought to a stop. A signal line from the head 59 is connected to a semiconductor device 65 by way of a flexible cable (FPC) 63.

Figure 3:
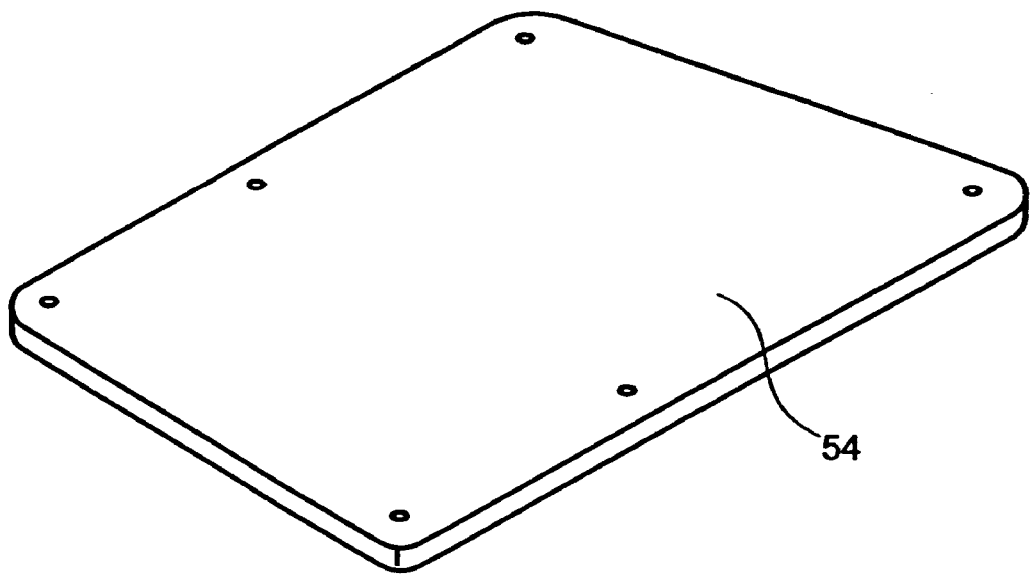
FIG. 3 is an exploded view of the magnetic disk drive 50.
Figure 3:
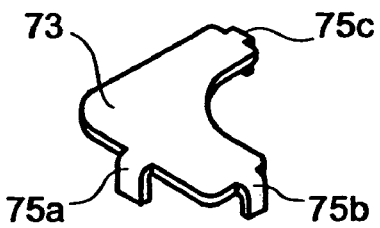
Figure 3:
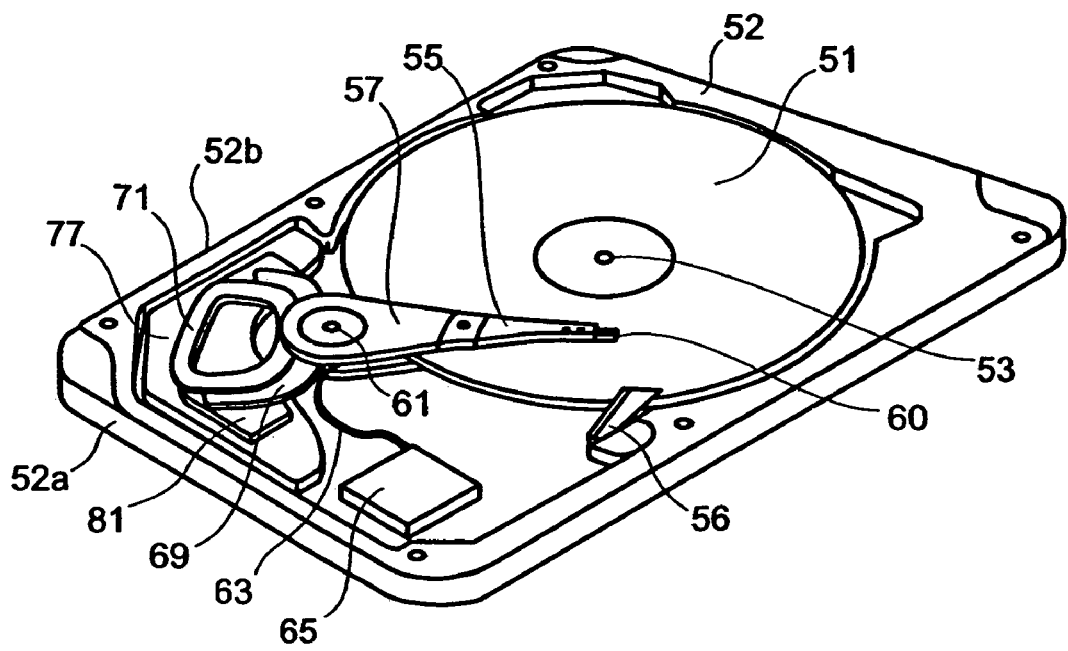

FIG. 3 is an exploded view of the magnetic disk drive 50. The casing lid 54 is mounted to the casing main body 52 to define a totally closed space therebetween. A main yoke 73 is shown as detached from the casing main body 52 below the casing lid 54. As a result, the coil support 69, the voice coil 71 supported by the coil support 69, a voice coil magnet 81, and an auxiliary yoke 77 are shown as exposed on the side of the casing main body 52. The main yoke 73 is provided with yoke legs 75a to 75c formed by bending the same.

Figure 1A:
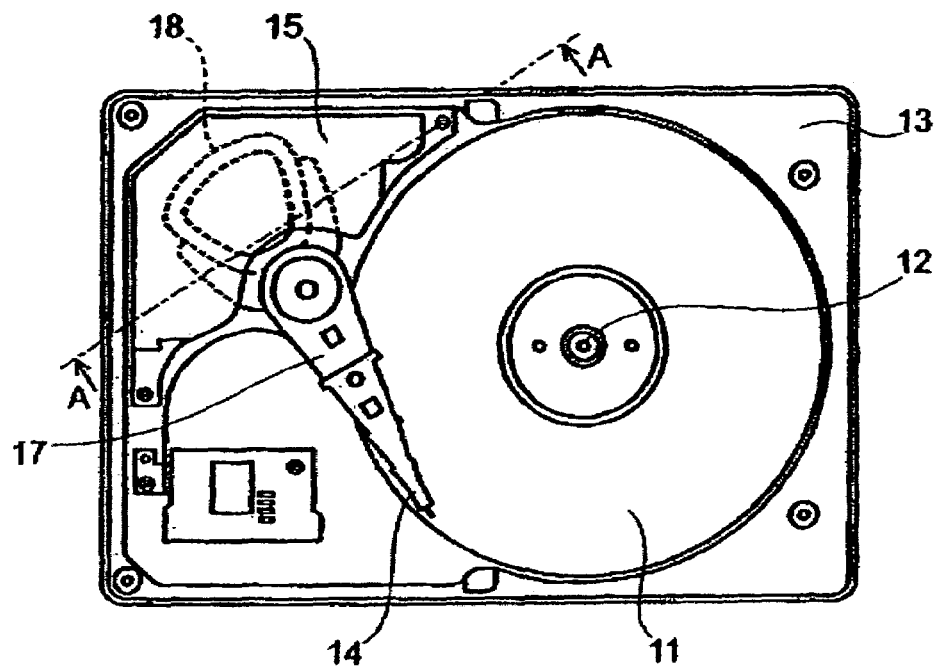
FIGS. 1(A) and 1(B) are views showing a yoke structure of a VCM in a conventional magnetic disk drive.
Figure 1B:
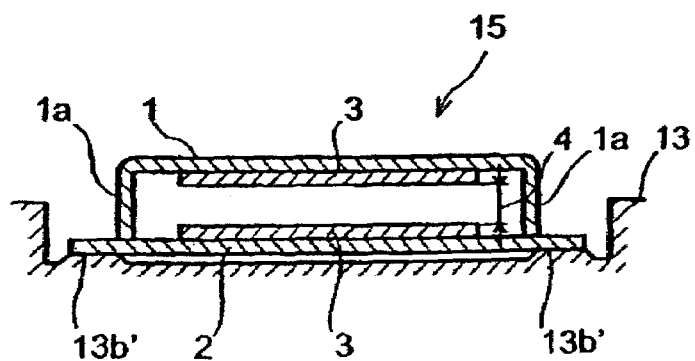
Figure 4:
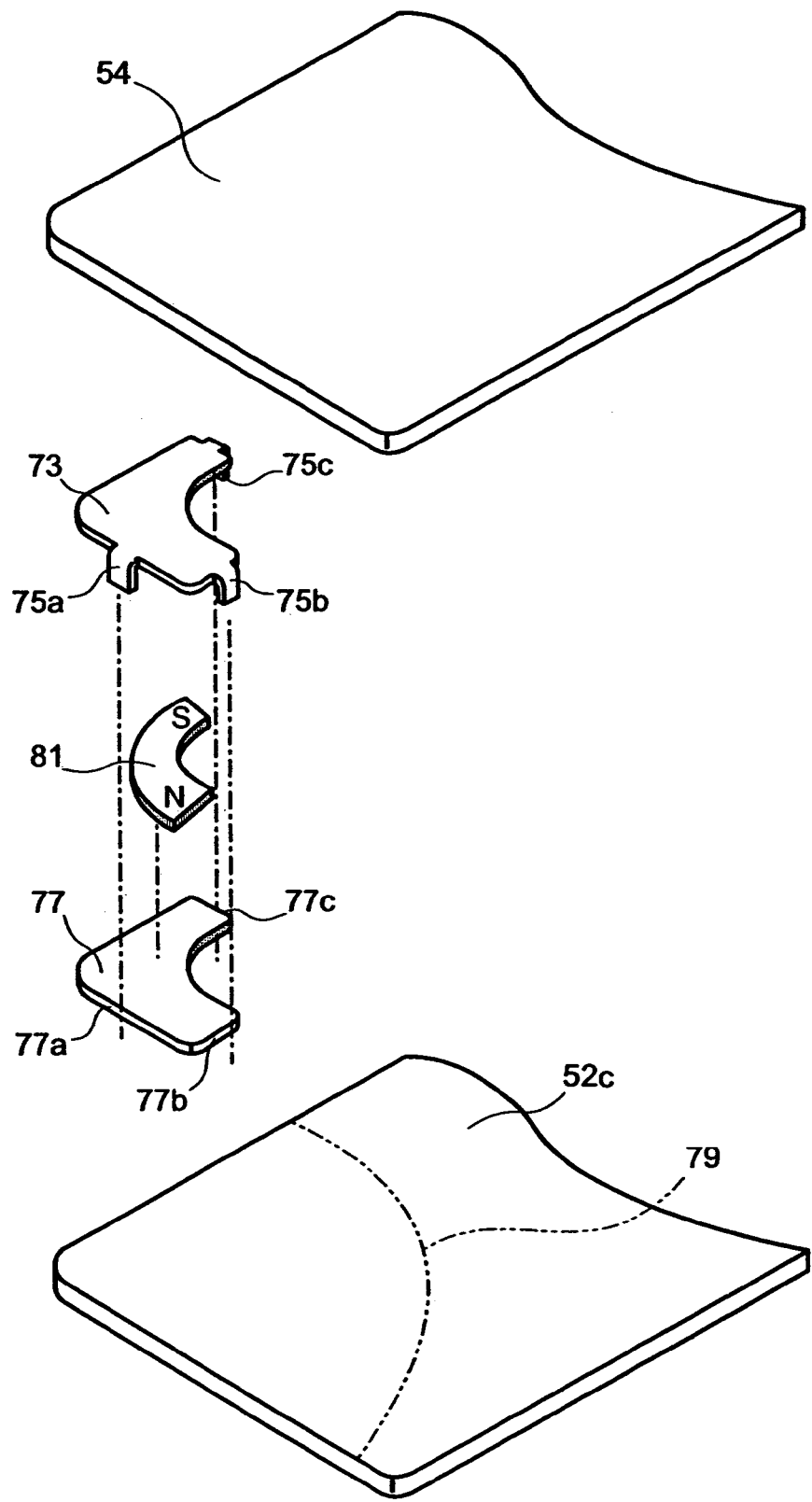
FIG. 4 is an exploded view showing a yoke portion of a voice coil motor 67.
Figure 5:
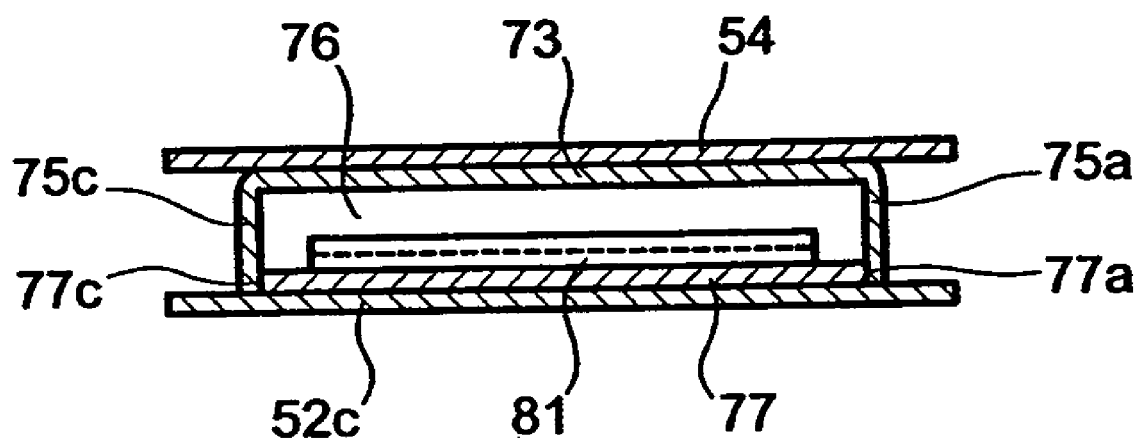
FIG. 5 is a cross-sectional view of the yoke portion in an assembled state taken along line A-A of FIG. 1.
Figure 5:
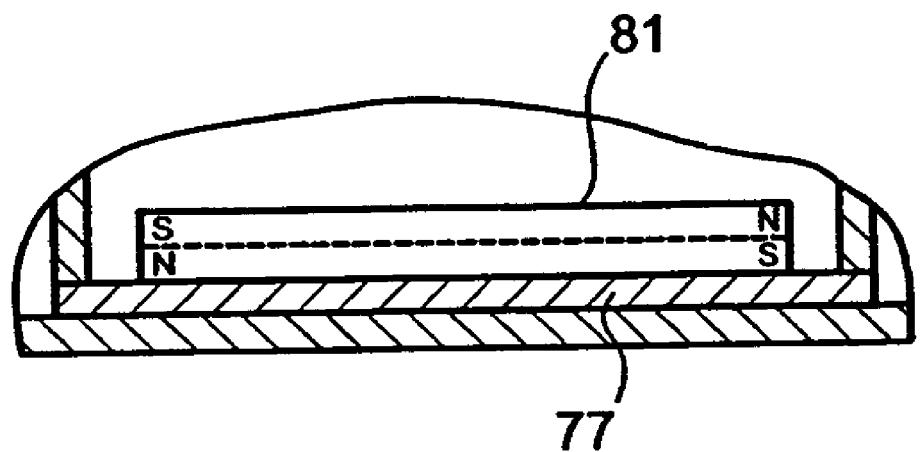

The main yoke 73 and the auxiliary yoke 77 are made of the ordinary cold-rolled steel plate (SPCC) as a ferromagnetic material. Sidewalls 52a, 52b of the casing 52 are provided around the main yoke 73 and the auxiliary yoke 77. FIG. 4 is an exploded view showing the yoke structure of the voice coil motor 67. FIG. 5 is a cross-sectional view of the yoke structure taken along arrow A-A of FIG. 1. To simplify explanation, the coil support 69 and the voice coil 71 are omitted in FIG. 5. The voice coil 71 is disposed so as to move freely in a yoke gap to be described later.

The yoke structure will be described in detail with reference to FIGS. 4 and 5. For the sake of explanation, parts of the casing lid 54 and the casing main body 52 are cut out to show only the portions of the casing lid 54 and the casing main body 52 near the voice coil motor. A yoke area 79 is defined on a base 52c of the casing main body 52. The yoke area 79 represents a portion that is formed from a ferromagnetic body, apart from other portions of the casing main body 52, and that forms part of a magnetic circuit of the VCM 67. An auxiliary yoke 77 formed into a flat sheet shape is disposed adjacent to the base 52c of the casing main body 52 and bonded thereto with an adhesive.

For the adhesive, one having a product code of 2087F sold from Three Bond Co., Ltd. is available. The auxiliary yoke 77 is formed from a ferromagnetic material having high permeability. In accordance with the embodiment, the ordinary cold-rolled steel plate (SPCC) is used for the auxiliary yoke 77. The auxiliary yoke 77 is provided with side surfaces serving as engaging portions 77a to 77c, respectively. A voice coil magnet 81 made of permanent magnet is disposed on a front surface of the auxiliary yoke 77 and bonded thereon using an adhesive. For the adhesive, one having a product designation of LOCTITE366 is available from Loctite Corporation.

41 The voice coil magnet 81 is provided with two magnetic pole pieces having north and south poles formed integrally with each other on a front surface thereof in contact with the space. The two poles are demarcated at a transition area.

Referring to FIG. 5, magnetic pole pieces each having a polarity opposite to that of each of the magnetic pole pieces of the front surface are formed on the back surface, of the voice coil magnet 81, in contact with the auxiliary yoke 77. A magnetic path is formed as detailed in the following. Specifically, the magnetic flux that comes out from the north pole piece on the front surface into a yoke gap 76 passes through the main yoke and the like and enters the South pole piece on the back surface. The magnetic flux that comes out from the north pole piece on the back surface passes through the main yoke and the like and enters through the yoke gap 76 into the south pole piece on the front surface.

The main yoke 73 is provided with an opposing surface that confronts the front surface of the voice coil magnet 81. The yoke gap 76 is defined between the opposing surface of the main yoke 73 and the front surface of the voice coil magnet 81. The yoke legs 75a to 75c of the main yoke 73 are respectively engaged with the engaging portions 77a to 77c of the auxiliary yoke 77 when the main yoke 73 and the auxiliary yoke 77 are assembled together. Dimensions of the yoke legs 75a to 75c are strictly controlled when the yoke legs 75a to 75c are manufactured so that the yoke legs 75a to 75c are properly engaged with the engaging portions 77a to 77c, respectively. Through this stringent control of the dimensions, accurate positioning of the main yoke 73 and the auxiliary yoke 77 with respect to the base 52c can be achieved as follows. Specifically, the auxiliary yoke 77 is first secured at a predetermined position of the base in the assembly process. When the main yoke 73 is next assembled, it is needed only to fit the yoke legs 75a to 75c into the engaging portions 77a to 77c of the auxiliary yoke 77, respectively.

The conventional approach to correctly position the main yoke was to screw the yoke legs onto the base 52c. The conventional method, however, required a subsidiary process for sealing screw holes made through the base. In accordance with the present embodiment, accurate positioning on the base can be achieved by simply fitting the yoke legs of the main yoke into the engaging portions of the auxiliary yoke. The yoke legs 75a to 75c are magnetically coupled to the engaging portions 77a to 77c of the auxiliary yoke 77, respectively. At the same time, the yoke legs 75a to 75c are magnetically coupled to the base 52c. The yoke legs 75a to 75c may be magnetically coupled only to the auxiliary yoke 77 directly by simply attaching the yoke legs 75a to 75c thereon. However, it would be advantageous in terms of meeting tolerances in the height direction of the yoke structure to mount the yoke legs 75a to 75c on the base 52c.

That is, it is necessary to strictly control the following dimensions to avoid interference with the casing lid or the coil support: specifically, the height from the base 52c to a surface of the main yoke 73 on the side of the casing lid 54 and the height from the base 52c to the opposing surface of the main yoke 53 confronting the voice coil magnet 81. If the yoke legs 75 are mounted on the auxiliary yoke 77, however, a machining error of the auxiliary yoke 77 is added. It is therefore preferable that the yoke legs 75 be directly mounted on the base 52c.

The same ferromagnetic material is used for the main yoke 73 and the auxiliary yoke 77. As long as a material having an appropriate permeability for allowing the magnetic flux to pass therethrough is used, however, it is possible to adequately select one for the main yoke 73 from among one group of materials and the other for the auxiliary yoke 77 from among another group of materials. According to the embodiment, dimensions are selected as follows: specifically, the thickness of the base 52c is 0.4 mm; the thickness of the auxiliary yoke 77 is 0.3 mm; the thickness of the voice coil magnet 81 is 0.8 mm; the thickness of the main yoke is 0.45 mm; and the yoke gap is 0.8 mm.

Magnetic fields running in two different vertical directions are formed by the voice coil magnet 81 in the yoke gap 76. The voice coil 71 is disposed in the yoke gap 76 so as to move freely therein in a horizontal direction. When current flows through the voice coil, forces that different sides of the voice coil receive from the magnetic fields running in the corresponding directions are composed. This causes the actuator head suspension assembly 58 (see FIG. 1) to turn about the pivot shaft 61.

The actuator head suspension assembly 58 can position the head 59 at a required track position on the magnetic disk 51 through controlling the direction and magnitude of current flowing through the voice coil 71. To allow the VCM 67 to give the actuator head suspension assembly 58 a required driving force, it is necessary to keep the magnitude of the magnetic flux passing through the yoke gap 76 at a predetermined value or higher.

One of the possible methods to increase the magnetic flux is to make the voice coil magnet 81 larger. This is, however, restricted by space limitation. Another method is to reduce the magnetic resistance of an entire magnetic circuit that forms a path for the magnetic flux passing through the yoke gap 76. The magnetic resistance is produced from the yoke gap 76 and the yoke. Making small the yoke gap 76 is restricted, since a yoke coil must be disposed therein. The magnetic resistance of the yoke depends on the permeability and cross-sectional area of the yoke material.

In accordance with the embodiment of the present invention, the yoke is composed of the main yoke 73, the yoke legs 75, the auxiliary yoke 77, and the base 52c. The base 52c is made of a ferromagnetic material, exhibiting high permeability. Since the base 52c has a thin wall and an insufficient cross-sectional area, however, the magnetic flux is saturated. The base 52c therefore allows only an insufficient amount of magnetic flux to pass therethrough and thus is not suitable, on its own, for the magnetic circuit of the VCM. In accordance with the embodiment, therefore, the auxiliary yoke 77 provides, together with the base 52c, the magnetic circuit that forms a path for the magnetic flux, thereby helping reduce the magnetic resistance.

The magnetic flux emanated from the north pole piece of the voice coil magnet 81 into the yoke gap 76 passes through the opposing surface of the main yoke 73. The magnetic flux then enters the main yoke 73 to branch into the yoke legs 75a to 75c. The casing lid 54, made of a nonmagnetic material, allows little magnetic flux to pass therethrough. The main yoke satisfactorily serves the purpose of forming a magnetic circuit even when the casing lid does not function as a path for magnetic flux. It is not therefore necessary that the main yoke 73 and the casing lid 54 be magnetically coupled to each other. Part of the magnetic flux passing through each of the yoke legs flows into the auxiliary yoke 77 by way of the side surfaces thereof, returning to the south pole piece of the voice coil magnet 81. The remainder of the magnetic flux flows into the base 52c through a bottom portion of the yoke leg. The remainder then flows past the auxiliary yoke 77 before returning to the south pole piece of the voice coil magnet 81. The magnetic flux emanated from the south pole piece of the voice coil magnet 81 into the yoke gap 76 flows to the north pole piece through a path in a direction opposite to that of the magnetic flux emanated from the north pole piece.

In accordance with the embodiment, the dedicated yoke adopted in the conventional yoke structure and disposed on an underside is eliminated and the auxiliary yoke and the casing main body are incorporated in part of the magnetic circuit.

This arrangement allows an auxiliary yoke that is thinner than the dedicated lower portion yoke, making it possible to reduce the height of the entire yoke structure.

In accordance with the embodiment of the present invention, the auxiliary yoke 77 has only to be disposed-in a state, in which the auxiliary yoke 77 is magnetically coupled to the casing main body 52. The auxiliary yoke 77 may therefore be disposed adjacent to the base 52c and secured in position through a method other than that using the adhesive, for example, through screwing, a fitting structure, or the like. In addition, the main yoke 73 may be screwed in position to the base 52c and the position of the auxiliary yoke 77 may be defined by the yoke legs 75 and the engaging portions 77a to 77c with reference to the position of the main yoke 73. If the foregoing arrangement is feasible, then the auxiliary yoke 77 may not necessarily be secured to the base 52c.

An important aspect about the auxiliary yoke 77 is that the auxiliary yoke 77 is magnetically coupled to the base 52c so as to form a magnetic circuit, through which the magnetic flux generated by the voice coil magnet 81 is easy to flow. To achieve this purpose, the auxiliary yoke 77 should be designed to have a cross-sectional area of a predetermined value or more to prevent magnetic saturation from occurring. In addition, a magnetic coupling between the auxiliary yoke 77 and the base 52c need be sufficiently strong.

To strengthen the magnetic coupling, it is desirable that no air gap be produced in a joining surface between the auxiliary yoke 77 and the base 52c. It is therefore preferable that the auxiliary yoke 77 and the base 52c be machined to have respective smooth surfaces of a predetermined area or more for mutual contact. In the embodiment, the casing lid 54 is not incorporated into the magnetic circuit. Because the casing main body is to be used as part of the magnetic circuit, the casing lid 54 may be made of a ferromagnetic material for use as part of the magnetic circuit. A number of other embodiments including this method are possible. These other embodiments of the present invention will be described with reference to FIGS. 6(A), 6(B), and 6(C) and onward.

Figure 6:
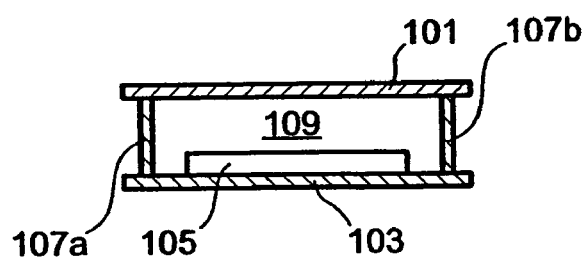
FIGS. 6(A) to 6(C) are cross-sectional views showing yoke structures used for describing a second embodiment of the present invention.
Figure 6:
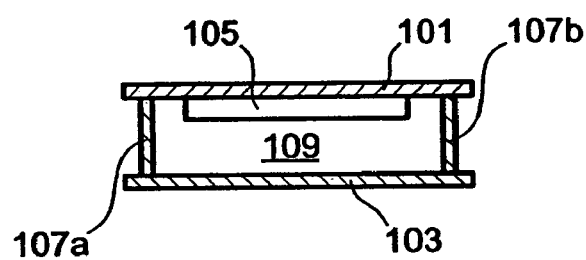
Figure 6:
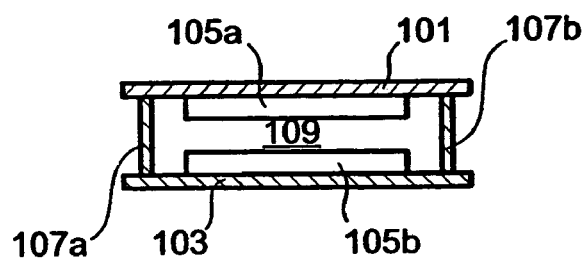

FIGS. 6(A), 6(B), and 6(C) are cross-sectional views showing yoke structures used for describing a second embodiment of the present invention. Each of the yoke structures in FIGS. 6(A), 6(B), and 6(C) shows that a magnetic circuit is formed using a yoke area 103 defined in part of the casing main body and a yoke area 101 defined in part of the casing lid, without use of any main yoke or auxiliary yoke at all. The yoke areas 103, 101 may be used as part of the magnetic circuit of the VCM 67. To that end, the yoke area 103 and the yoke area 101 are to be at least areas formed from a ferromagnetic material of the entire casing main body or the entire casing lid, and are disposed near the VCM 67.

The yoke areas 103, 101 should not be construed as the only portion, through which the magnetic flux passes, in the casing main body or the casing lid. The yoke area is the area formed as a path of magnetic flux for the VCM, in the entire casing main body or the entire casing lid. In addition, the yoke area may be said to be a range, over which the required magnetic flux for the VCM passes, if the entire casing main body or the entire casing lid is formed from an adequate material and has an adequate cross-sectional area so as to function as a magnetic flux path for the voice coil.

The casing sidewalls 52a, 52b of the casing main body located near the VCM shown in FIG. 3 may be formed from a ferromagnetic material. This allows the casing sidewalls 52a, 52b to be used as a magnetic circuit connecting the yoke area 103 and the yoke area 101. In this case, it is necessary that the yoke areas 103, 101 be magnetically coupled to the casing sidewalls 52a, 52b. Alternatively, connecting yokes 107a, 107b formed from a ferromagnetic material may be used to magnetically couple the yoke area 103 onto the yoke area 101. The yoke areas 103, 101 are to be formed from a material having a required permeability and into a cross-sectional area sufficient for ensuring that the magnetic flux is not saturated. As a result, a magnetic circuit for the VCM can be formed without using a dedicated yoke other than the casing. A yoke structure that helps make the magnetic disk drive even thinner can thus be achieved.

Referring to FIG. 6(A), a magnet 105 is mounted on an inner surface of the yoke area 103. A yoke gap 109 is defined between a front surface of the magnet 105 and an inner surface of the yoke area 101. In FIG. 6(B), a magnet 105 is mounted on an inner surface of the yoke area 101 and a yoke gap 109 is defined between a front surface of the magnet 105 and an inner surface of the yoke area 103.

In FIG. 6(C), a magnet includes two magnet element 105a, 105b. One magnet element 105a is mounted on an inner surface of a yoke area 101 and the other magnet element 105b is mounted on an inner surface of a yoke area 103. A yoke gap 109 is defined between a front surface of the magnet element 105a and a front surface of the magnet element 105b. Referring to FIGS. 6(A) through 6(C), the magnet or magnets supported by the actuator head suspension assembly are disposed in the yoke gap 109.

FIGS. 7(A) through 7(F) are cross-sectional views showing yoke structures according to a third embodiment of the present invention. In arrangements shown in FIGS. 7(A) to 7(F), yoke areas 201, 211, 221 of the casing lid or yoke areas 203, 213, 223 of the casing main body are formed from a ferromagnetic material. Each of these yoke areas, however, has a thin wall and a small cross-sectional area and thus is not suitable for a magnetic circuit on its own. These yoke areas are therefore made thicker than other areas to allow the casing lid or the casing main body to be adaptable to the magnetic circuit of the VCM.

Referring to FIGS. 7(A) and 7(B), an area 201a formed to have a thicker wall than other areas for forming a magnetic circuit is formed in the yoke area 201 of the casing lid. If the entire body of the casing lid is integrally formed from a ferromagnetic material, a magnetic flux flows through portions other than the area 201a formed to have a thicker wall than in other areas. The area 201a formed to have a thicker wall than in other areas nonetheless forms a magnetic circuit that allows a magnetic flux suitable for the VCM to flow. The casing main body is formed from a ferromagnetic material having a uniform thickness throughout the entire base including the yoke area 203.

Connecting yokes 207a, 207b magnetically couple the yoke area 201 onto the yoke area 203 to form a magnetic circuit. The connecting yokes 207a, 207b are formed from a ferromagnetic material and provided with a cross-sectional area suitable for the magnetic circuit of the VCM. Each of the connecting yokes 207a, 207b is mounted so that one end thereof is magnetically coupled to an inner surface of the yoke area 203 and the other end thereof is magnetically coupled to a side surface of the area 201a formed to have a thicker wall than in other areas and a front surface of a thinner area of the yoke area 201. Another possible arrangement is to make the other end of the connecting yokes 207a, 207b directly coupled magnetically only to the front surface of the area 201a formed to have a thicker wall than in other areas.

In FIG. 7(A), a magnet 205 is mounted on an inner surface of the yoke area 203 and a yoke gap 209 is defined between a front surface of the magnet 205 and a front surface of the area 201a formed to have a thicker wall than in the other areas. In FIG. 7(B), a magnet 205 is mounted on the area 201a formed to have a thicker wall than in the other areas and a yoke gap 209 is defined between a front surface of the magnet 205 and an inner surface of the yoke area 203. Irrespective of the examples of FIGS. 7(A) and 7(B), the magnet may be attached both to the inner surface of the yoke area 203 and to the front surface of the area 201a formed to have a thicker wall than in the other areas.

In FIGS. 7(C) and 7(D), an area 213a formed to have a thicker wall than in other areas is formed in a yoke area 213. This is done because the casing main body having a thin wall is not suitable, as is, for the magnetic circuit of the VCM. If the casing main body is integrally formed from a ferromagnetic material, the magnetic flux flows also through portions other than the area formed to have a thicker wall than in other areas. A substantial part of the magnetic flux, however, passes through the area 213a formed to have a thicker wall than in other areas. The casing lid including a yoke area 211 is formed from a ferromagnetic material to have a uniform thickness throughout its entire areas.

Connecting yokes 217a, 217b magnetically couple the yoke area 211 to the yoke area 213 to form a magnetic circuit. The connecting yokes 217a, 217b are formed from a ferromagnetic material. Each of the connecting yokes 217a, 217b is mounted so that one end thereof is magnetically coupled to an inner surface of the yoke area 211 and the other end thereof is magnetically coupled to a side surface of the area 213a formed to have a thicker wall than in other areas and a front surface of a thinner area. Another possible arrangement is to make the other end of the connecting yokes 217a, 217b directly coupled magnetically only to the front surface of the area 213a formed to have a thicker wall than in other areas.

In FIG. 7(C), a magnet 215 is mounted on an inner surface of the yoke area 211 and a yoke gap 219 is defined between a front surface of the magnet 215 and a front surface of the area 213a formed to have a thicker wall than in other areas. In FIG. 7(D), a magnet 215 is mounted on a front surface of the area 213a formed to have a thicker wall than in other areas and a yoke gap 219 is defined between an inner surface of the yoke area 211 and a front surface of the magnet 215.

Figure 7:
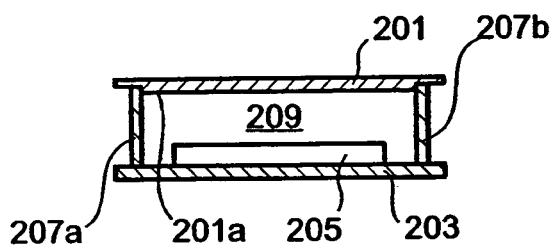
FIGS. 7(A) to 7(F) are cross-sectional views showing yoke structures used for describing a third embodiment of the present invention.
Figure 7:
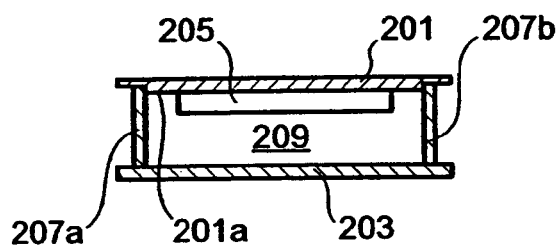
Figure 7:
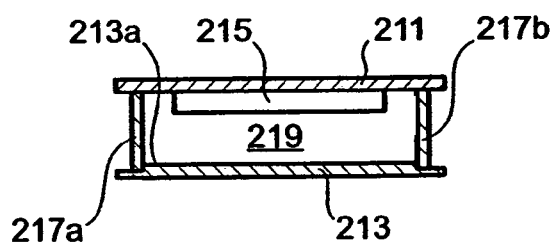
Figure 7:
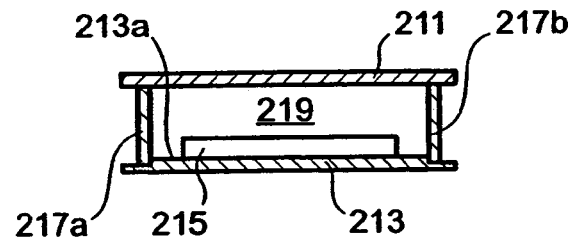
Figure 7:
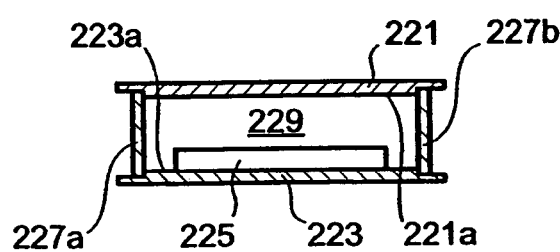
Figure 7:
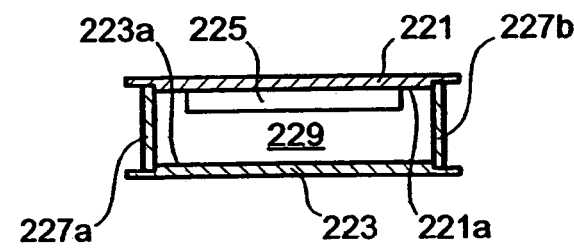

The connecting yoke may be shaped into a bar or a wall as long as the connecting yoke has a required cross-sectional area and permeability is selected appropriately so that magnetic resistance falls within a required range. Irrespective of the examples shown in FIGS. 7(C) and 7(D), the magnet may be attached both to the inner surface of the yoke area 211 and to the front surface of the area 213a formed to have a thicker wall than in other areas. Referring to FIGS. 7 (E) and (F), the wall thickness of both the casing main body and the casing lid is small and thus the two are not good for the magnetic circuit of the VCM. Areas 223a, 221a formed to have a thicker wall than in other areas are therefore formed in yoke areas 223, 221, respectively, to form a magnetic circuit.

Connecting yokes 227a, 227b magnetically couple the yoke area 221 to the yoke area 223 to form a magnetic circuit. The connecting yokes 227a, 227b are formed from a ferromagnetic material. Each of the connecting yokes 227a, 227b is mounted so that one end thereof is magnetically coupled to a side surface of the area 221a formed to have a thicker wall than in other areas and a front surface of a thinner area and the other end thereof is magnetically coupled to a side surface of the area 223a formed to have a thicker wall than in other areas and a front surface of a thinner area. Irrespective of the examples shown in FIGS. 7(E) and (F), each of the connecting yokes 227a, 227b may be mounted so that one end thereof is directly magnetically coupled only to the front surface of the area 221a formed to have a thicker wall than in other areas and the other end thereof is directly magnetically coupled only to the front surface of the area 223a formed to have a thicker wall than in other areas.

In FIG. 7(E), a magnet 225 is mounted on an inner surface of the area 223a formed to have a thicker wall than in other areas. A yoke gap 229 is defined between a front surface of the area 221a formed to have a thicker wall than in other areas and a front surface of the magnet 225. In FIG. 7(F), a magnet 225 is mounted on a front surface of the area 221a formed to have a thicker wall than in other areas and a yoke gap 229 is defined between a front surface of the magnet 225 and a front surface of the area 221a formed to have a thicker wall than in other areas. Irrespective of the examples shown in FIGS. 7(E) and 7(F), the magnet may be attached both to the front surface of the area 221a formed to have a thicker wall than in other areas and to the front surface of the area 223a formed to have a thicker wall than in other areas.

As explained with reference to FIGS. 6(A) to 6(C), according to the yoke structures depicted in FIGS. 7(A) through 7(F), there is no need to provide for the entire casing main body and the entire casing lid a thickness suitable for a magnetic circuit, if the casing lid and the casing main body are to be used as the magnetic circuit by eliminating a dedicated yoke. This contributes to a reduced overall height of the magnetic disk and a reduced amount of materials required. It is not necessary, either, to incorporate an additional part such as the auxiliary yoke to form the magnetic circuit.

FIGS. 8(A), 8(B), 8(C), and 8(D) are cross-sectional views showing yoke structures used for describing a fourth embodiment of the present invention. In arrangements shown in FIGS. 8(A) to 8(D), yoke areas 301, 401 of the casing lid are formed from a ferromagnetic material. Each of these yoke areas, however, has a thin wall and an insufficient cross-sectional area and thus is not suitable for a magnetic circuit on its own. Auxiliary yokes 311, 411 are therefore added to form a suitable magnetic circuit. Each of the auxiliary yokes 311, 411 is formed into a flat sheet using a ferromagnetic material. As compared with the dedicated yoke, the auxiliary yoke may be made thinner since it forms the magnetic circuit with the casing lid.

Figure 8:
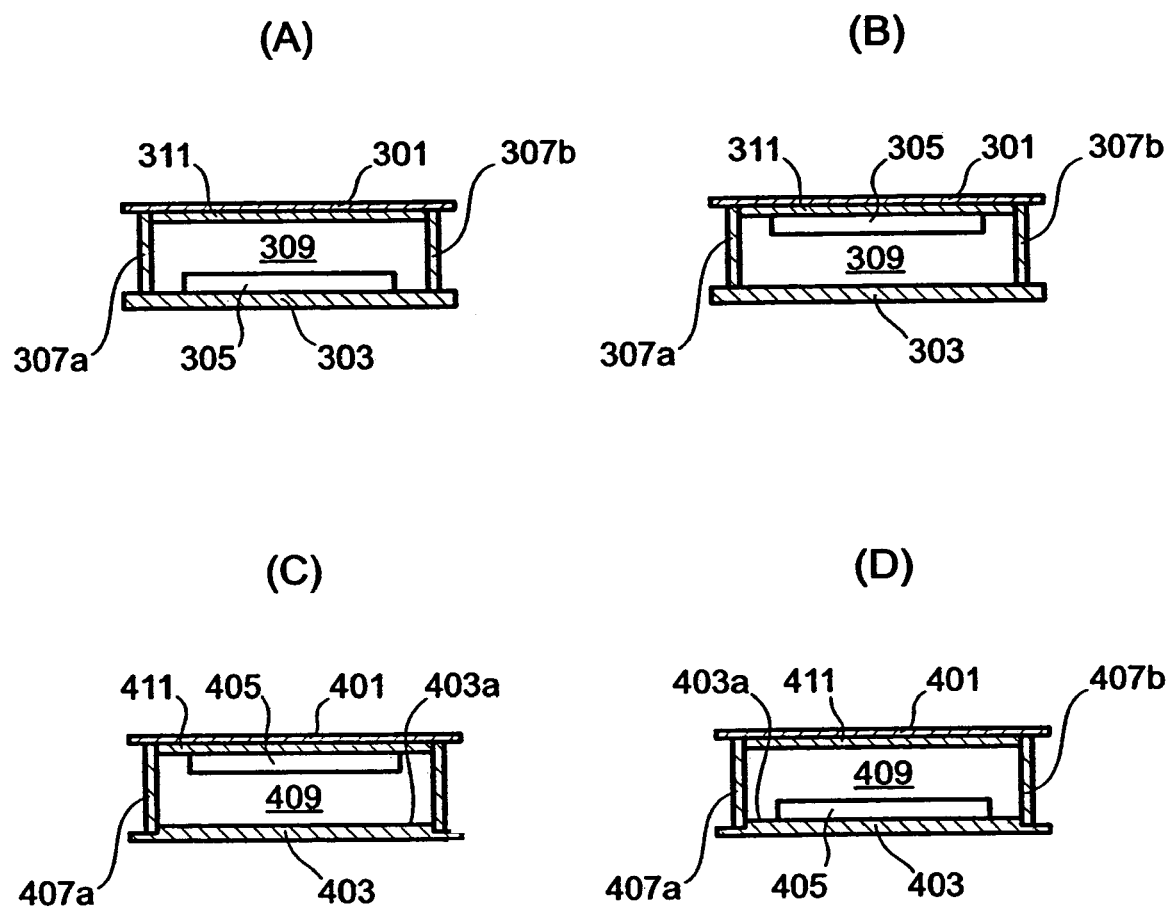
FIGS. 8(A) to 8(D) are cross-sectional views showing yoke structures used for describing a fourth embodiment of the present invention.

In FIGS. 8(A) and 8(B), the auxiliary yoke 311 is mounted on an inner surface of the yoke area 301 of the casing lid. The yoke area 301 and the auxiliary yoke 311 together form a magnetic circuit. The entire casing main body is formed from a ferromagnetic material into a uniform thickness including a yoke area 303. Connecting yokes 307a, 307b magnetically couple the yoke area 301 of the casing lid to the yoke area 303 of the casing main body. Each of the connecting yokes 307a, 307b is mounted so that one end thereof is magnetically coupled to an inner surface of the yoke area 301 and a side surface of the auxiliary yoke 311 and the other end thereof is magnetically coupled to a front surface of the yoke area 303. Each of the connecting yokes 307a, 307b may be mounted so that one end thereof is directly magnetically coupled only to a front surface of the auxiliary yoke 311.

In FIG. 8(A), a magnet 305 is mounted on an inner surface of the yoke area 303 and a yoke gap 309 is defined between a front surface of the auxiliary yoke 311 and a front surface of the magnet 305. In FIG. 8(B), a magnet 305 is mounted on a front surface of the auxiliary yoke 311 and a yoke gap 309 is defined between a front surface of the magnet 305 and an inner surface of the yoke area 303. Magnetic flux emanated from the magnet 305 flows past the auxiliary yoke 311, the yoke area 301, the connecting yokes 307a, 307b, the yoke area 303, and the yoke gap 309.

In FIGS. 8(C) and 8(D), an area 403a formed to have a thicker wall than in other areas is formed in a yoke area 403 of the casing main body. Connecting yokes 407a, 407b magnetically couple a yoke area 401 to a yoke area 403. The connecting yoke 407a is mounted so that one end thereof is magnetically coupled to a side surface of the area 403a formed to have a thicker wall than in other areas and a front surface of areas having a thin wall and the other end thereof is magnetically coupled to an inner surface of the yoke area 401 and a side surface of an auxiliary yoke 411. The connecting yoke 407a may be mounted so that one end thereof is directly magnetically coupled only to a front surface of the area 403a formed to have a thicker wall than in other areas and the other end thereof is directly magnetically coupled only to a front surface of the auxiliary yoke 411.

In FIG. 8(C), a magnet 405 is mounted on a front surface of the auxiliary yoke 411. A yoke gap 409 is defined between a front surface of the magnet 405 and a front surface of the area 403a formed to have a thicker wall than in other areas. In FIG. 8(D), a magnet 405 is mounted on the front surface of the area 403a formed to have a thicker wall than in other areas and a yoke gap 409 is formed between a front surface of the magnet 405 and a front surface of the auxiliary yoke 411.

As shown in FIGS. 8(A) through 8(D), the auxiliary yoke magnetically coupled to the casing lid is used to let the casing lid and the auxiliary yoke-share in passing the magnetic flux therethrough for forming a magnetic circuit. This arrangement allows the casing lid to be manufactured so as to have a thin wall overall. The arrangement also makes for easier manufacturing of the casing lid than in forming in the yoke area a local area formed to have a thicker wall than in other areas.

FIGS. 9(A), 9(B), 9(C), and 9(D) are cross-sectional views showing yoke structures used for describing a fifth embodiment of the present invention. In arrangements shown in FIGS. 9(A) to 9(D), yoke areas 503, 603 of the casing main body are formed from a ferromagnetic material. Each of these yoke areas, however, has a thin wall and an insufficient cross-sectional area and thus is not suitable for a magnetic circuit on its own. Auxiliary yokes 511, 611 formed into a flat sheet using a ferromagnetic material are therefore added to provide a configuration adaptable to the magnetic resistance.

Figure 9:
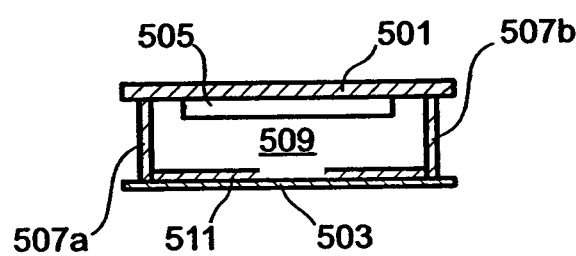
FIGS. 9(A) to 9(D) are cross-sectional views showing yoke structures used for describing a fifth embodiment of the present invention.
Figure 9:
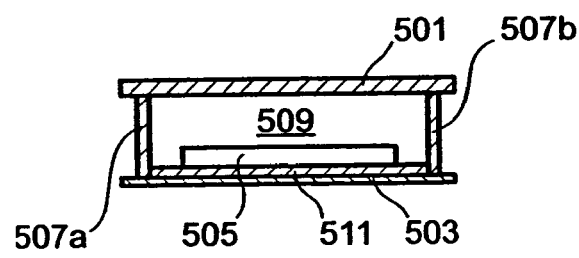
Figure 9:
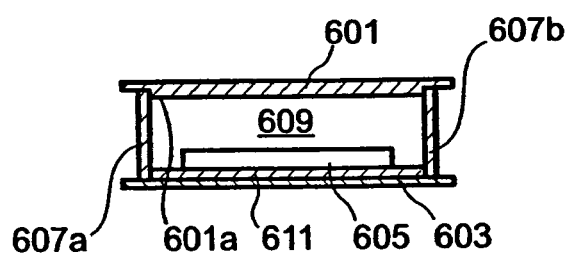
Figure 9:
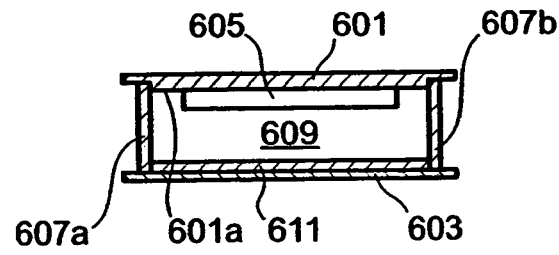

In FIGS. 9(A) and 9(B), the auxiliary yoke 511 is mounted on an inner surface of the yoke area 503 of the casing main body. The entire casing lid is formed from a ferromagnetic material into a uniform thickness including a yoke area 501. Connecting yokes 507a, 507b magnetically couple the yoke area 503 of the casing main body to the yoke area 501 of the casing lid. Each of the connecting yokes 507a, 507b is mounted so that one end thereof is magnetically coupled to an inner surface of the yoke area 503 and a side surface of the auxiliary yoke 511 and the other end thereof is magnetically coupled to an inner surface of the yoke area 501. Each of the connecting yokes 507a, 507b may be mounted so that one end thereof is directly magnetically coupled only to a front surface of the auxiliary yoke 511.

In FIG. 9(A), a magnet 505 is mounted on the yoke area 501 and a yoke gap 509 is formed between a front surface of the auxiliary yoke 511 and a front surface of the magnet 505. In FIG. 9(B), a magnet 505 is mounted on a front surface of the auxiliary yoke 511 and a yoke gap 509 is defined between a front surface of the magnet 505 and an inner surface of the yoke area 501. Magnetic flux emanated from the magnet 505 flows past the auxiliary yoke 511, the yoke area 503, the connecting yokes 507a, 507b, the yoke area 501, and the yoke gap 509.

In FIGS. 9(C) and 9(D), an area 601a formed to have a thicker wall than in other areas is formed in a yoke area 601 of the casing lid. Connecting yokes 607a, 607b magnetically couple the yoke area 601 to a yoke area 603. The connecting yoke 607a is mounted so that one end thereof is magnetically coupled to a side surface of the area 603a formed to have a thicker wall than in other areas and a front surface of areas having a thin wall and the other end thereof is magnetically coupled to an inner surface of the yoke area 603 and a side surface of an auxiliary yoke 611. Each of the connecting yokes 607a, 607b may be mounted so that one end thereof is directly magnetically coupled only to a front surface of the area 603a formed to have a thicker wall than in other areas and the other end thereof is directly magnetically coupled only to a front surface of the auxiliary yoke 611.

In FIG. 9(C), a magnet 605 is mounted on a front surface of the auxiliary yoke 611 and a yoke gap 609 is defined between a front surface of the magnet 605 and a front surface of the area 601a formed to have a thicker wall than in other areas. In FIG. 9(D), a magnet 605 is mounted on the front surface of the area 601a formed to have a thicker wall than in other areas and a yoke gap 609 is defined between a front surface of the magnet 605 and a front surface of the auxiliary yoke 611.

As shown in FIGS. 9(A) through 9(D), the auxiliary yoke magnetically coupled to the casing main body is used to let the casing main body and the auxiliary yoke share in passing the magnetic flux therethrough for forming a magnetic circuit. This arrangement allows the casing main body to be manufactured so as to have a thin wall overall. The arrangement also makes for easier manufacturing of the casing main body than in forming in the yoke area a local area formed to have a thicker wall than in other areas.

Figure 10:
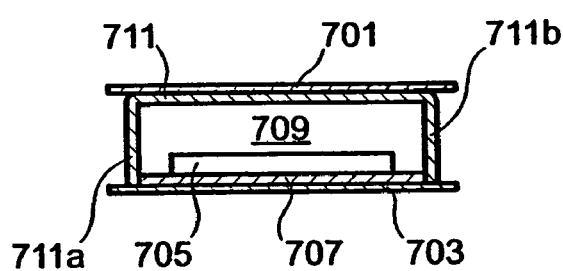
FIGS. 10(A) to 10(D) are cross-sectional views showing yoke structures used for describing a sixth preferred embodiment of the present invention.
Figure 10:
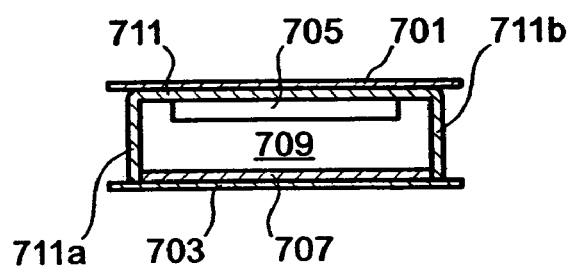
Figure 10:
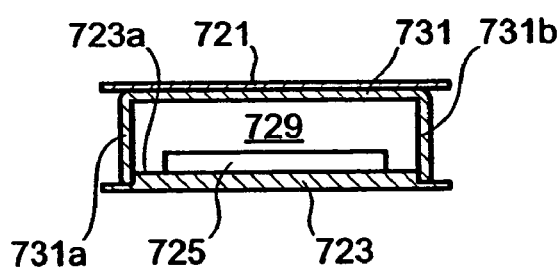
Figure 10:
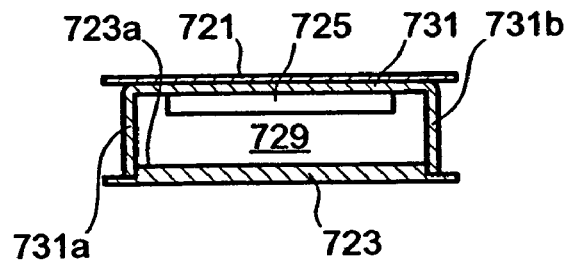

FIGS. 10(A), 10(B), 10(C), and 10(D) are cross-sectional views showing yoke structures used for describing a sixth embodiment of the present invention. In arrangements shown in FIGS. 10(A) to 10(D), main yokes 711, 731 are provided so as not to use casing lids 701, 721 as a magnetic circuit. It is therefore possible to form the casing lid from a nonmagnetic material. FIG. 10(A) provides a yoke structure having the same structure as the embodiment explained with reference to FIGS. 2 to 5.

Each of the yoke structures shown in FIGS. 10(A) and 10(B) is composed of the main yoke 711, yoke legs 711a, 711b formed by bending part of the main yoke 711, a magnet 705, an auxiliary yoke 707, and a yoke area 703 of a casing main body. These components are formed from a ferromagnetic material. There is no need of forming the entire casing main body from a ferromagnetic material. Rather, it is necessary to form at least the yoke area 703 from a ferromagnetic material so that the yoke area 703 can be used as part of the magnetic circuit. The main yoke 711 is provided with an opposing surface that confronts a front surface of the magnet 705. The main yoke 711 is magnetically coupled to a side surface of the auxiliary yoke 707 and an inner surface of the yoke area 703 through the yoke legs 711a, 711b. The yoke legs 711a, 711b maybe mounted so as to be directly magnetically coupled only to a front surface of the auxiliary yoke 707.

The yoke legs 711a, 711b may be formed from a material different from that used for an area near the opposing surface of the main yoke 711. Referring to FIG. 10(A), the magnet 705 is mounted on the auxiliary yoke 707. A yoke gap 709 is defined between the opposing surface of the main yoke 711 and the front surface of the magnet 705. Referring to FIG. 10(B), the magnet 705 is mounted on the opposing surface of the main yoke 711. A yoke gap 709 is defined between the front surface of the magnet 705 and the front surface of the auxiliary yoke 707.

Magnetic flux emanated from the magnet 705 flows past the main yoke 711, the yoke legs 711a, 711b, the auxiliary yoke 707, the yoke area 703, and the yoke gap 709. The magnet flux flowing through the yoke legs 711a, 711b branches into the auxiliary yoke 707 and the yoke area 703. This prevents magnetic saturation from occurring even if the casing main body has a thin wall.

The yoke structures depicted in FIGS. 10(C) and 10(D) differ from those described with reference to FIGS. 10(A) and 10(B) in the following point. Specifically, a yoke area 723 of the casing main body is provided with an area 723a that is formed to have a thicker wall than in other areas. A main yoke 731 has an opposing surface. The main yoke 731 is magnetically coupled, through the yoke legs 731a, 731b, to a side surface of the area 723a formed on the yoke area 723 to have a thicker wall than in other areas and a front surface of the area having a thin wall. The yoke legs 731a, 731b may be mounted so as to be directly magnetically coupled only to a front surface of the area 723a formed to have a thicker wall than in other areas.

In FIG. 10(C), a magnet 725 is mounted on the front surface of the area 723a formed to have a thicker wall than in other areas. A yoke gap 729 is defined between the opposing surface of the main yoke 731 and the front surface of the magnet 725. In FIG. 10(D), a magnet 725 is mounted on the opposing surface of the main yoke 731. A yoke gap 729 is defined between the front surface of the magnet 725 and the front surface of the area 723a formed to have a thicker wall than in other areas.

Magnetic flux emanated from the magnet 725 flows past the main yoke 731, the yoke legs 731a, 731b, the area 723a formed to have a thicker wall than in other areas, and the yoke gap 729. The magnet flux flowing through the yoke legs 731a, 731b flows through the area 723a formed to have a thicker wall than in other areas. This prevents magnetic saturation from occurring even if the entire casing main body has a thin wall. Another possible arrangement is to mount the yoke legs 711a, 711b, 731a, 731b so as to fit into a side surface of the auxiliary yoke 707 or a side surface of the area 723a formed to have a thicker wall than in other areas. This eliminates the process of positioning the main yoke, if the auxiliary yoke or the area formed to have a thicker wall than in other areas has been correctly positioned relative to the casing main body.

According to each of the embodiments depicted in FIGS. 10(A) through 10(D), there is no need to use the casing lid as the magnetic circuit. Meanwhile, since the casing main body is used as the magnetic circuit, it is possible to keep the height of the entire yoke structure low.

While the present invention has been described based on the specific embodiments depicted in the accompanying drawings, it will be understood that the invention is not limited thereto, but numerous changes in the details of construction may be resorted to without departing from the spirit and scope of the invention as claimed, as long as the effects of the invention are produced.

The rotating disk storage device in accordance with embodiments of the present invention is applicable to general rotating disk storage devices provided with actuator assemblies.

What is claimed is:

1. A rotating disk storage device, comprising:
   a rotating disk recording medium;
   an actuator head suspension assembly including a head for reading data from said rotating disk recording medium;
   a casing main body including a first yoke area formed from a ferromagnetic material;
   a casing lid including a second yoke area formed from a ferromagnetic material and magnetically coupled to said first yoke area;
   a magnet disposed so as to be magnetically coupled to either said first yoke area or said second yoke area;
   a coil held in position on said actuator head suspension assembly and disposed in a yoke gap defined between said magnet and either said first yoke area or said second yoke area;
   an auxiliary yoke disposed so as to be magnetically coupled to one of said first yoke area and said second yoke area; and
   a connecting yoke magnetically coupling said auxiliary yoke to the other of said first yoke area and said second yoke area instead of, or together with, magnetically coupling said first yoke area to said second yoke area;
   wherein said magnet is disposed so as to be magnetically coupled to said auxiliary yoke;
   wherein the second yoke area includes a second yoke portion formed separate from said casing lid and magnetically coupled to a first yoke portion within said first yoke area.

2. The rotating disk storage device according to claim 1, wherein either said first yoke area or said second yoke area is formed to have a thicker wall than in other areas for forming a magnetic circuit.

3. The rotating disk storage device according to claim 1, wherein both said first yoke area and said second yoke area are formed to have a thicker wall than in other areas for forming a magnetic circuit.

4. The rotating disk storage device according to claim 1, further comprising:
   said auxiliary yoke disposed so as to be magnetically coupled to one of said first yoke area and said second yoke area, the other of said first yoke area and said second yoke area being formed to have a thicker wall than in other areas; and
   said connecting yoke magnetically coupling said auxiliary yoke to either said first yoke area formed to have a thicker wall than in other areas or said second yoke area formed to have a thicker wall than in other areas instead of, or together with, magnetically coupling said first yoke area to said second yoke area;
   wherein said magnet is disposed so as to be magnetically coupled to said auxiliary yoke.

5. The rotating disk storage device according to claim 4, wherein said magnet is disposed so as to be magnetically coupled to either said first yoke area formed to have a thicker wall than in other areas or said second yoke area formed to have a thicker wall than in other areas.

6. The rotating disk storage device according to claim 1, further comprising:
   and a second auxiliary yoke disposed so as to be magnetically coupled, respectively, to said first yoke area and said second yoke area; and
   said connecting yoke magnetically coupling said first auxiliary yoke to said second auxiliary yoke instead of, or together with, magnetically coupling said first yoke area to said second yoke area;
   wherein said magnet is disposed so as to be magnetically coupled to said first auxiliary yoke or said second auxiliary yoke.

7. A rotating disk storage device, comprising:
   a rotating disk recording medium;
   an actuator head suspension assembly including a head for reading data from said rotating disk recording medium;
   a casing main body including a first yoke area formed from a ferromagnetic material;
   a casing lid including a second yoke area formed from a ferromagnetic material and magnetically coupled to said first yoke area;

a first magnet and a second magnet disposed so as to be magnetically coupled, respectively, to said first yoke area and said second yoke area;

a coil held in position on said actuator head suspension assembly and disposed in a yoke gap disposed between said first magnet and said second magnet;

an auxiliary yoke disposed so as to be magnetically coupled to one of said first yoke area and said second yoke area; and a connecting yoke magnetically coupling said auxiliary yoke to the other of said first yoke area and said second yoke area, instead of, or together with, magnetically coupling said first yoke area to said second yoke area;

wherein either said first magnet or said second magnet is disposed so as to be magnetically coupled to said auxiliary yoke;

wherein the second yoke area includes a second yoke portion formed separate from said casing lid and magnetically coupled to a first yoke portion within said first yoke area.

8. The rotating disk storage device according to claim 7, wherein either said first yoke area or said second yoke area is formed to have a thicker wall than in other areas for forming a magnetic circuit.

9. The rotating disk storage device according to claim 7, wherein both said first yoke area and said second yoke area are formed to have a thicker wall than in other areas for forming a magnetic circuit.

10. The rotating disk storage device according to claim 7, further comprising:

said auxiliary yoke disposed so as to be magnetically coupled to one of said first yoke area and said second yoke area, the other of said first yoke area and said second yoke area being formed to have a thicker wall than in other areas; and said connecting yoke magnetically coupling said auxiliary yoke to either said first yoke area formed to have a thicker wall than in other areas or said second yoke area formed to have a thicker wall than in other areas instead of, or together with, magnetically coupling said first yoke area to said second yoke area;

wherein said first magnet and said second magnet are disposed so as to be magnetically coupled to either said auxiliary yoke or said first yoke area formed to have a thicker wall than in other areas or said second yoke area formed to have a thicker wall than in other areas.

11. The rotating disk storage device according to claim 7, further comprising:

and a second auxiliary yoke disposed so as to be magnetically coupled, respectively, to said first yoke area and said second yoke area; and said connecting yoke magnetically coupling said first auxiliary yoke to said second auxiliary yoke instead of, or together with, magnetically coupling said first yoke area to said second yoke area;

wherein said first magnet is disposed so as to be magnetically coupled to said first auxiliary yoke and said second magnet is disposed so as to be magnetically coupled to said second auxiliary yoke.

* * * * *

UNITED STATES PATENT AND TRADEMARK OFFICE
CERTIFICATE OF CORRECTION

PATENT NO. : 7,420,782 B2  Page 1 of 1
APPLICATION NO. : 10/893070
DATED : September 2, 2008
INVENTOR(S) : Kawakami et al.

It is certified that error appears in the above-identified patent and that said Letters Patent is hereby corrected as shown below:

Column 14, claim 6, line 3, after "further comprising:" change "and a second auxiliary yoke" to -- a second auxiliary yoke --

Column 16, claim 11, line 3, after "further comprising:" change "and a second auxiliary yoke" to -- a second auxiliary yoke --

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO.         : 7,420,782 B2
APPLICATION NO.    : 10/893070
DATED              : September 2, 2008
INVENTOR(S)        : Kawakami et al.

It is certified that error appears in the above-identified patent and that said Letters Patent is hereby corrected as shown below:

Column 14, claim 6, line 49, after "further comprising:" change "and a second auxiliary yoke" to -- a second auxiliary yoke --

Column 16, claim 11, line 19, after "further comprising:" change "and a second auxiliary yoke" to -- a second auxiliary yoke --

This certificate supersedes the Certificate of Correction issued November 11, 2008.

Signed and Sealed this

Ninth Day of December, 2008

JON W. DUDAS
*Director of the United States Patent and Trademark Office*